(12) United States Patent
Chhabra et al.

(10) Patent No.: US 10,492,155 B2
(45) Date of Patent: Nov. 26, 2019

(54) ASSOCIATION BASED ON SHARED NETWORK-STATE INFORMATION

(71) Applicant: Apple Inc., Cupertino, CA (US)

(72) Inventors: Kapil Chhabra, Milpitas, CA (US); Welly Kasten, San Jose, CA (US); Vinesh Pallen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 205 days.

(21) Appl. No.: 15/148,283

(22) Filed: May 6, 2016

(65) Prior Publication Data

US 2016/0330635 A1    Nov. 10, 2016

Related U.S. Application Data

(60) Provisional application No. 62/158,371, filed on May 7, 2015.

(51) Int. Cl.
| | |
|---|---|
| *H04W 24/02* | (2009.01) |
| *H04W 56/00* | (2009.01) |
| *H04L 29/08* | (2006.01) |
| *H04W 40/24* | (2009.01) |
| *H04W 4/80* | (2018.01) |

(Continued)

(52) U.S. Cl.
CPC ......... *H04W 56/001* (2013.01); *H04L 67/104* (2013.01); *H04L 67/2842* (2013.01); *H04W 4/80* (2018.02); *H04W 40/244* (2013.01); *H04W 76/30* (2018.02); *H04L 43/10* (2013.01); *H04W 48/16* (2013.01); *H04W 84/12* (2013.01); *H04W 84/18* (2013.01); *H04W 88/06* (2013.01)

(58) Field of Classification Search
CPC ..................................... H04W 24/02
See application file for complete search history.

(56) References Cited

U.S. PATENT DOCUMENTS

| | | | |
|---|---|---|---|
| 2010/0091657 A1* | 4/2010 | Tsfaty ............... | H04W 52/0248 370/241 |
| 2013/0196600 A1* | 8/2013 | Capers ................. | H04W 24/06 455/41.2 |

(Continued)

*Primary Examiner* — Sulaiman Nooristany
(74) *Attorney, Agent, or Firm* — Sterne, Kessler, Goldstein & Fox P.L.L.C.

(57) ABSTRACT

The present disclosure describes an electronic device that includes an antenna and an interface circuit. The interface circuit communicates, via the antenna, with a companion electronic device and/or a communication hub (e.g., an access point). The companion electronic device may communicate with the communication hub over a wireless network. During operation, the electronic device receives, from the companion electronic device or an archive electronic device, network-state information including an identifier of the companion electronic device, an identifier of the communication hub, or timing-synchronization information for beacons from the communication hub. In some embodiments, the network-state information may further include a channel associated with the connection. Moreover, the electronic device may disable communication via a first communication technique (e.g., Bluetooth) and enable communication via a second communication technique (e.g., WiFi). Furthermore, the electronic device may associate with the communication hub on the wireless network based on the network-state information.

20 Claims, 5 Drawing Sheets

(51) Int. Cl.
　　　*H04W 76/30*　　　(2018.01)
　　　*H04W 48/16*　　　(2009.01)
　　　*H04W 84/12*　　　(2009.01)
　　　*H04W 88/06*　　　(2009.01)
　　　*H04W 84/18*　　　(2009.01)
　　　*H04L 12/26*　　　(2006.01)

(56) References Cited

U.S. PATENT DOCUMENTS

| | | | | |
|---|---|---|---|---|
| 2014/0341100 | A1* | 11/2014 | Sun | H04W 52/0238 |
| | | | | 370/311 |
| 2015/0373769 | A1* | 12/2015 | Wang | H04W 8/005 |
| | | | | 455/419 |
| 2016/0165552 | A1* | 6/2016 | Narang | H04W 52/0277 |
| | | | | 370/311 |

* cited by examiner

ASSOCIATION BASED ON SHARED NETWORK-STATE INFORMATION

BACKGROUND

Field

The described embodiments relate to techniques for improving communication performance in a wireless network, including techniques for using shared network-state information from a companion electronic device for associating with a communication hub.

Related Art

Many electronic devices include a networking subsystem to wirelessly communicate with other electronic devices. For example, these other electronic devices can include a networking subsystem with a cellular network interface (e.g., Universal Mobile Telecommunications System (UMTS) or Long-Term Evolution (LTE)), a wireless local area network interface (e.g., a wireless network such as described in the Institute of Electrical and Electronics Engineers (IEEE) 802.11 standard (which is sometimes referred to as "WiFi") or Bluetooth from the Bluetooth Special Interest Group of Kirkland, Wash.), and/or other types of wireless interfaces.

However, certain communication techniques may be preferred for particular applications. For example, for high-throughput data transfers between a pair of electronic devices (e.g., music library synchronization, photograph synchronization, address-book synchronization, and software-update downloads), WiFi may be preferred to Bluetooth.

For the data transfer to occur, the pair of electronic devices typically needs to be on the same network. When joining a WiFi network, an electronic device usually scans multiple channels to find a known network. However, this scanning operation typically consumes a considerable amount of power and delays the electronic device in associating with the WiFi network and receiving high-throughput data transfer from another electronic device.

SUMMARY

In some embodiments, an electronic device is disclosed that includes a processor configured to communicate, via an antenna, with a companion electronic device or a communication hub (e.g., a Wireless Access Point (WAP)). The companion electronic device may communicate with the communication hub over a wireless connection. During operation, the electronic device receives, from the companion electronic device or an archive electronic device. The network-state information may include an identifier of the companion electronic device, an identifier of the communication hub, and/or timing-synchronization information for beacons from the communication hub. In some embodiments, the network-state information may further include a channel associated with the wireless connection. Moreover, the electronic device may disable communication via a first communication technique (e.g., Bluetooth) and enable communication via a second communication technique (e.g., WiFi). Furthermore, the electronic device may associate with the communication hub based on the network-state information.

In some embodiments, the network-state information may be received from the companion electronic device via the first communication technique. Alternatively or additionally, the network-state information may be received from the archive electronic device using a cellular-telephone communication technique, the second communication technique (e.g., WiFi), and/or a peer-to-peer communication technique.

In some embodiments, the first communication technique may include Bluetooth and the second communication technique may include WiFi. Furthermore, the communication hub may include a device such as an access point, a set-top box, a printer, and/or a thermostat.

In some embodiments, the network-state information may specify when the communication hub is within a time interval of transmitting a beacon. Therefore, the electronic device may disable the first communication technique based on the network-state information.

In some embodiments, to associate with the communication hub, the electronic device performs an "active scan", e.g., provides a probe request to the communication hub, and receives a response from the communication hub.

In some embodiments, after associating, the electronic device may communicate with the communication hub and/or the companion electronic device. The communication with the companion electronic device may use the second communication technique (e.g., WiFi).

In some embodiments, the electronic device may include a processor and a memory that stores a program module. The program module may be executed by the processor, and the program module may include instructions for receiving network state information from the companion electronic device or the archive electronic device, disabling communication with the companion electronic device or the archive electronic device via a first communication technique (e.g., Bluetooth), enabling communication with the companion electronic device or the archive electronic device via a second communication technique (e.g., WiFi), and associating with the communication hub based at least in part on the network-state information.

In some embodiments, a computer-program product for use with the electronic device is disclosed. This computer-program product includes instructions for at least some of the aforementioned operations performed by the electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

DETAILED DESCRIPTION

During an association technique, a companion electronic device may provide updated network-state information to an electronic device or an archive electronic device when a change in the network is detected. The electronic device may use the updated network-state information to associate with a communication hub (e.g., an access point). In particular, when the electronic device attempts to associate with the communication hub, the electronic device may suspend or disable communication via a first communication technique (e.g., Bluetooth) and may subsequently enable communication via a second communication technique (e.g., WiFi). Then, the electronic device may associate with the communication hub using the second communication technique based on the updated network-state information.

In this way, this association technique may allow the electronic device to quickly connect or associate with the communication hub. For example, during this connection or association, Bluetooth may be suspended briefly (e.g., 1-2 s) so that the electronic device can use WiFi communication to synchronize and connect with the communication hub. However, this results in a time interval when neither the Bluetooth nor the WiFi transports are available. By reducing the time spent on connection activities, such as scanning and associating, the association technique may improve the user experience and, thus, user satisfaction when using the electronic device.

In general, the information communicated between the electronic devices in the disclosed association techniques may be conveyed in packets or frames that are transmitted and received by radios in the electronic devices in accordance with a communication protocol, such as an Institute of Electrical and Electronics Engineers (IEEE) 802.11 standard (WiFi), Bluetooth (from the Bluetooth Special Interest Group of Kirkland, Wash.), a cellular-telephone communication protocol, and/or another type of wireless interface (e.g., a peer-to-peer communication technique). In the discussion below, Bluetooth and WiFi are used as illustrative examples.

Figure 1:
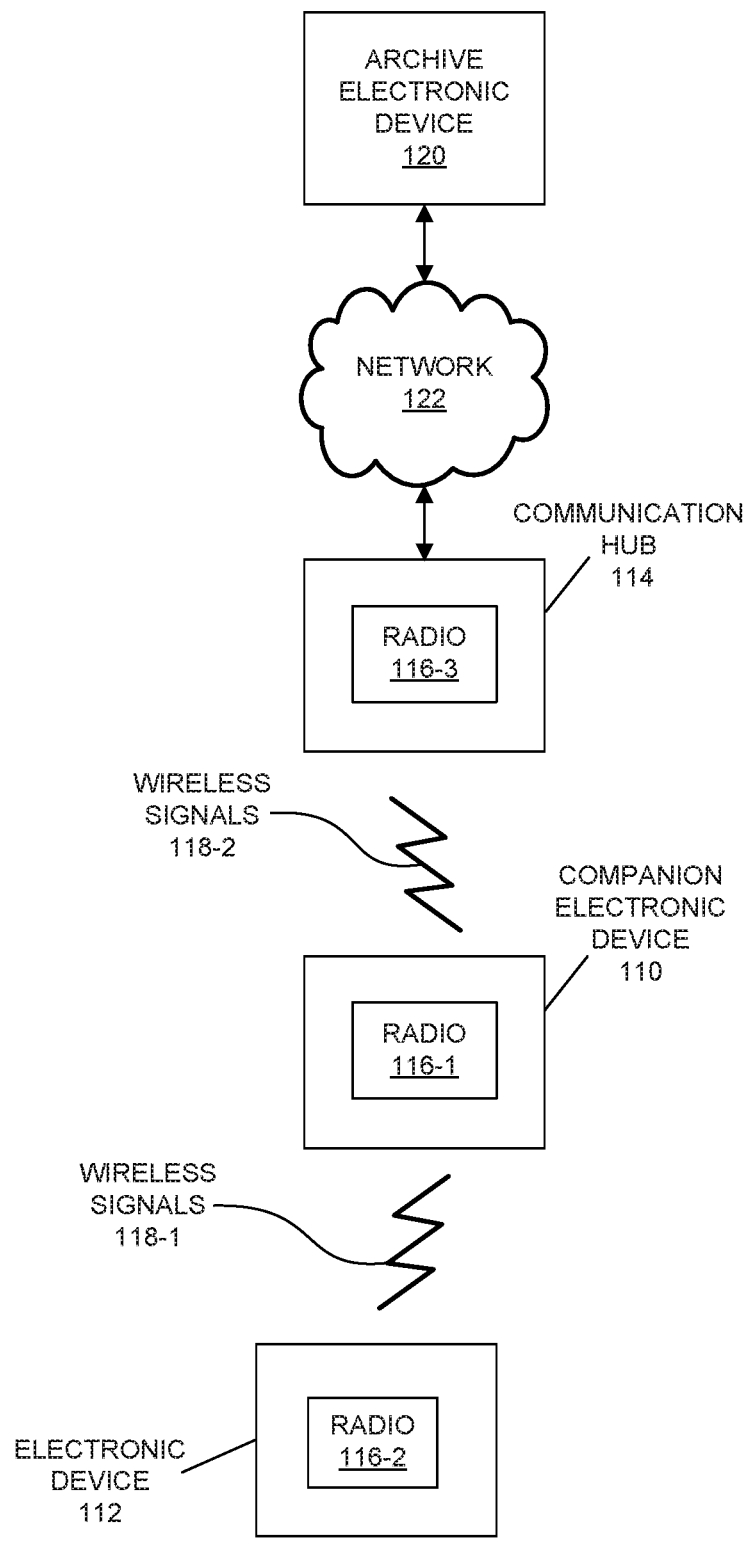
FIG. 1 is a block diagram illustrating example electronic devices communicating wirelessly, according to some embodiments.

The communication between the electronic devices is shown in FIG. 1, which represents an example block diagram illustrating a companion electronic device 110 (e.g., as a smartphone, a laptop computer or a tablet), an electronic device 112 (e.g., a smartwatch), and a communication hub 114 (e.g., an access point (AP), a printer, a thermostat, or a "soft" access point) wirelessly communicating with one another. In particular, these electronic devices may wirelessly communicate while detecting one another by scanning wireless channels, transmitting and receiving beacons or beacon frames on wireless channels, establishing connections (e.g., by transmitting connect requests), and/or transmitting and receiving packets or frames (which may include a request and/or additional information such as payload data).

As would be understood by a person of ordinary skill in the art, a beacon frame is a management frame periodically transmitted by an AP in IEEE 802.11 based wireless local access networks (WLANs) in a Basic Service Set (BSS) (a set consisting of all electronic devices including the AP in a WLAN). A beacon frame announces the presence of a WLAN AP and contains information about the WLAN network. The information contained in a beacon frame includes a time synchronization function (TSF) counter that is a timestamp used to synchronize a clock of all electronic devices in the WLAN with the clock of the AP. The information contained in a beacon frame further includes a beacon interval that indicates the time interval between subsequent beacon transmissions (beacon transmission period). The information contained in a beacon frame further includes a service set identifier (SSID) which is used as an identifier for a WLAN BSS. The information contained in a beacon frame further includes capability information, supported data rates and other characteristics of the WLAN.

As described further below with reference to FIG. 5, companion electronic device 110, electronic device 112 and communication hub 114 may include subsystems, such as a networking subsystem, a memory subsystem, and a processor subsystem. In addition, companion electronic device 110, electronic device 112, and communication hub 114 may include radios 116 in the networking subsystems. More generally, companion electronic device 110, electronic device 112, and communication hub 114 can include (or can be included within) any electronic devices with networking subsystems that enable companion electronic device 110, electronic device 112, and communication hub 114 to wirelessly communicate with another electronic device. This can include transmitting beacons on wireless channels to enable electronic devices to make initial contact with or to detect each other, followed by exchanging subsequent data/management frames (such as connect requests) to establish a connection (which is sometimes referred to as a "WiFi connection"), and configure security options (e.g., IPSec), transmit and receive packets or frames via the connection.

As can be seen in FIG. 1, wireless signals 118-1 (represented by a jagged line) are communicated by radios 116-1 and 116-2 in companion electronic device 110 and electronic device 112, respectively. For example, companion electronic device 110 and electronic device 112 may exchange packets using Bluetooth. In addition, wireless signals 118-2 (represented by a jagged line) are communicated by radios 116-1 and 116-3 in companion electronic device 110 and communication hub 114, respectively. The packets exchanged in this communication may be transmitted using a WiFi protocol in a wireless local area network (WLAN).

In particular, as described further below with reference to FIGS. 2-4, when companion electronic device 110 detects a change in the WLAN (such as a change in its connection status, or a change in the BSS, e.g., due to the companion electronic device's moving to a different BSS), communication hub 114, and/or the connection (which are collectively referred to as network-state information), companion electronic device 110 may provide updated network-state information to electronic device 112 (e.g., using Bluetooth). This updated network-state information may be cached by electronic device 112 for subsequent use. Alternatively or additionally, companion electronic device 110 may provide the updated network-state information to archive electronic device 120 via network 122 (e.g., the Internet), and archive electronic device 120 may provide the updated network-state information to electronic device 112 (e.g., the updated network-state information may be provided using a cellular-telephone communication technique, Bluetooth, WiFi, or a peer-to-peer communication technique). Thus, the network-state information may be remotely cached in archive electronic device 120 and/or locally cached in electronic device 112.

Based on the cached network-state information, electronic device 112 may be able to quickly and/or efficiently join the WLAN (e.g., associate with communication hub 114). For example, electronic device 112 may know when communication hub 114 will broadcast a beacon based on (i) a timing synchronization function (TSF) information included in the network-state information provided by companion electronic device 110 and (ii) the beacon interval of communication hub 114 (as indicated in previous beacon frames received by companion electronic device 110, and included in the network-state information provided by companion electronic device 110). Electronic device 112 may use this TSF and beacon interval information to disable communicating via Bluetooth, (e.g., by turning off a Bluetooth interface) and enable a WiFi interface just before the expected beacon (such as within 50 ms). As a result, electronic device 112 can receive the beacon and can associate with communication hub 114 using WiFi. Electronic device 112 may communicate with communication hub 114 directly using WiFi. Moreover, the network-state information may include information (e.g., basic service set identifier (BSSID) of communication hub 114, SSID of the network associated with companion electronic device 110, a WLAN channel used by companion electronic device 110) that allows electronic device 112 to associate with communication hub 114.

Companion electronic device 110 and electronic device 112 may be associated with a common user. For example, companion electronic device 110 and electronic device 112 may be trusted devices specified in a common user account.

In some embodiments, processing a packet or frame in companion electronic device 110, electronic device 112, and/or communication hub 114 includes: receiving wireless signals 118 encoding the packet or frame; decoding/extracting the packet or frame from received wireless signals 118 to acquire the packet or frame; and processing the packet or frame to determine information contained in the packet or frame (such as data in the payload).

The network environment shown in FIG. 1 is an example. In some embodiments, different numbers or types of electronic devices may be present. For example, some embodiments include more or fewer electronic devices. As another example, in some embodiments, different electronic devices can transmit and/or receive packets or frames.

Figure 2:
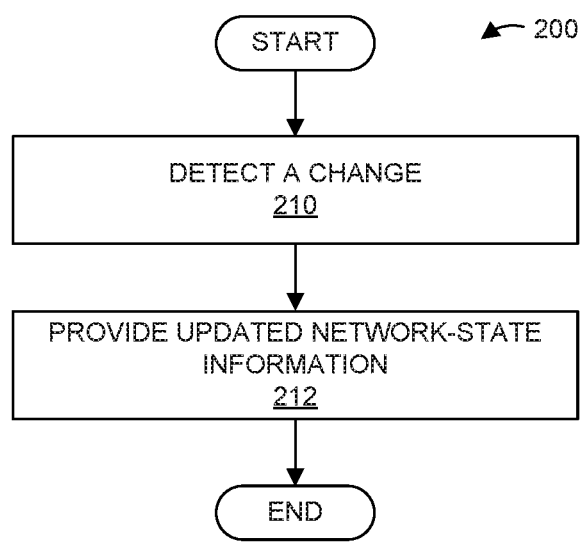
FIG. 2 is a flow diagram illustrating an example method for providing updated network-state information to an electronic device, according to some embodiments.

FIG. 2 presents a flow diagram illustrating an example method 200 for providing updated network-state information to at least one of the electronic devices in FIG. 1, according to some embodiments. In some embodiments, method 200 may be performed by a companion electronic device (such as companion electronic device 110 in FIG. 1). During operation, the companion electronic device detects a change (210) in a connection, a communication hub, and/or a WLAN. Then companion electronic device provides, to the electronic device and/or the archive electronic device, updated network-state information (212) that facilitates the electronic device associating with the communication hub (e.g., the companion electronic device may provide a differential update or change to previously provided network-state information). In particular, the updated network-state information may be cached by the electronic device and may be used to indicate to the electronic device when and how it can associate with the communication hub.

In some embodiments, the network-state information may include link information (e.g., the link up, the link down, changes to the link); information on when WiFi is turned off or disabled; information on the current network being used by the companion electronic device; information on when WiFi is disassociated (such as when a user steps out of their office); and information on when WiFi is re-associated. Moreover, the network-state information may include auto-association information, such as: the BSSID of the communication hub (and, more generally, an identifier of the communication hub); an identifier of the WLAN; a channel of the WLAN; the SSID of the companion electronic device (and, more generally, an identifier of the companion electronic device); a TSF; a beacon interval; and security information associated with the connection (which may include, e.g., which devices can or cannot join the connection).

In some embodiments, the companion electronic device provides the updated network-state information using transport layer encryption (e.g., intrusion detection system). Moreover, the companion electronic device may provide the updated network-state information to the electronic device in one or more key-value pairs in Bluetooth frames, according to some embodiments. After receiving the updated network-state information, the electronic device may provide an acknowledgment to the companion electronic device. If an acknowledgment is not received, the companion electronic device may provide the updated network-state information to the electronic device again.

Figure 3:
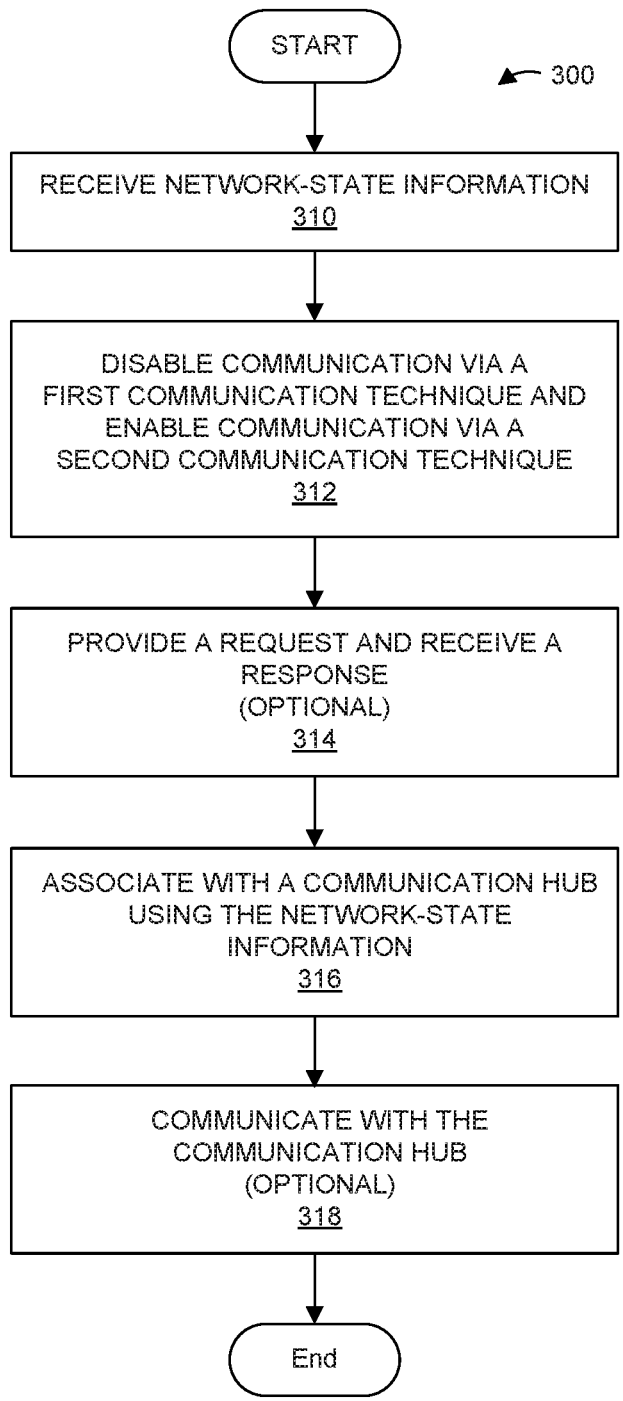
FIG. 3 is a flow diagram illustrating an example method for associating with a communication hub by an electronic device, according to some embodiments.

FIG. 3 presents a flow diagram illustrating an example method 300 for associating with a communication hub using an electronic device, e.g., one of the electronic devices in FIG. 1, according to some embodiments. In some embodiments, method 300 may be performed by an electronic device (such as electronic device 112 in FIG. 1). During operation, the electronic device receives, from the companion electronic device and/or the archive electronic device, network-state information (310) such as the channel associated with the connection, security information associated with the connection (which may include, e.g., devices that can or cannot join the connection), an identifier of the companion electronic device (e.g., the SSID or a portion of a MAC address), the identifier of the communication hub (e.g., the BSSID), and timing-synchronization information (e.g., the TSF), and the beacon interval of the communication hub. Together, the TSF and the beacon interval can indicate the timing of beacons from the communication hub. In an example, the network-state information may be received from the companion electronic device using a first communication technique such as Bluetooth. Alternatively or additionally, the network-state information may be received from the archive electronic device using a cellular-telephone communication technique and/or a peer-to-peer communication technique.

In some embodiments, based on the received network-state information, the electronic device may determine whether the companion electronic device is connected to the communication hub on a network, and whether the security settings of the network are such that the electronic device can join the network. For example, if the electronic device determines that the companion device is currently not connected to any network or determines that the network cannot be accessed by the electronic device (e.g., due to security restrictions), the electronic device may skip the subsequent operations in method 300 without wasting time and resources to try to join the network on which the companion electronic device communicates with the communication hub.

Moreover, the electronic device disables (or turns off) communication via a present (first) communication technique (312), such as Bluetooth, and enables a second communication technique (312), such as WiFi. Furthermore, the electronic device associates with the communication hub using the network-state information (316), where communication between the electronic device and the companion electronic device uses a second communication technique (e.g., WiFi) that is different than the current communication technique.

Additionally, the network-state information may specify, or otherwise provide an indication of, when the communication hub is within a time interval (e.g., 50 ms) of transmitting a beacon. Therefore, the electronic device may disable a non-WiFi communication protocol, e.g., Bluetooth, based on the network-state information at an appropriate time. For example, the electronic device may turn off or disable Bluetooth, and enable or turn on WiFi a predetermined amount of time before a beacon is expected to be transmitted by the communication hub. Thus, using the network-state information, the electronic device can associate, e.g., immediately, with an access point. Alternatively, if the companion electronic device is not currently associated with the WLAN, the WLAN is disabled, or the security settings of the WLAN do not allow the electronic device to join the WLAN, the electronic device does not attempt to associate or use the association technique to immediately associate with the communication hub. Instead, an alternate association technique may be used, including: scanning the available channels; going through a list of known networks to assess whether a known network is detected during the scan; and, if there is a known network detected during the scan, associating with the communication hub on the known network. Similarly, if the association technique does not work, the electronic device may revert to using the alternate association technique.

In some embodiments, prior to associating (316), the electronic device optionally provides a probe request to the communication hub and receives a response (314) from the communication hub. Thus, the electronic device may not wait for a beacon from the communication hub to associate.

Furthermore, after the associating (operation 316), the electronic device may optionally communicate with the communication hub, the companion electronic device, and/or the archive electronic device (operation 318). The communication with the companion electronic device may use the second communication technique, for example WiFi.

The companion electronic device may be able to connect with multiple networks (e.g., a corporate WiFi), which may include networks that the electronic device cannot access. However, in some embodiments, a delegated certificate is used for the electronic device to join the same network as the companion electronic device. Additionally or alternatively, the companion electronic device may function as a proxy for the electronic device (with support from the communication hub).

In some embodiments, after the electronic device joins the same WLAN the companion electronic device uses to communicate with the communication hub, the electronic device performs data exchange with the companion electronic device, other electronic devices in the WLAN, and/or the communication hub at a high data rate using the second communication technique. Optionally, after completing the data exchange at the high data rate, the electronic device turns off (disables) communication via the second communication technique (e.g., WiFi) and reverts back to communicating via the first communication technique (e.g., Bluetooth).

In some embodiments, at least some of the operations in method 200 of FIG. 2 and method 300 of FIG. 3 are performed by program modules that are executed in environments (e.g., the operating system) of the companion electronic device and the electronic device, respectively. Alternatively, some of the operations in methods 200 and 300 may be performed by interface circuits in the companion electronic device and the electronic device. For example, some of the operations may be performed by firmware executed by the interface circuits, such as firmware associated with a media access control (MAC) layer. In some embodiments, Bluetooth and WiFi are implemented using a common interface circuit (e.g., a dual-combo chip). This approach may allow a timing relationship between Bluetooth and WiFi to be known and shared between these two communication techniques, which may address time-sensitive aspects of the communication (e.g., knowing when to wake up and receive a beacon from an access point).

Figure 4:
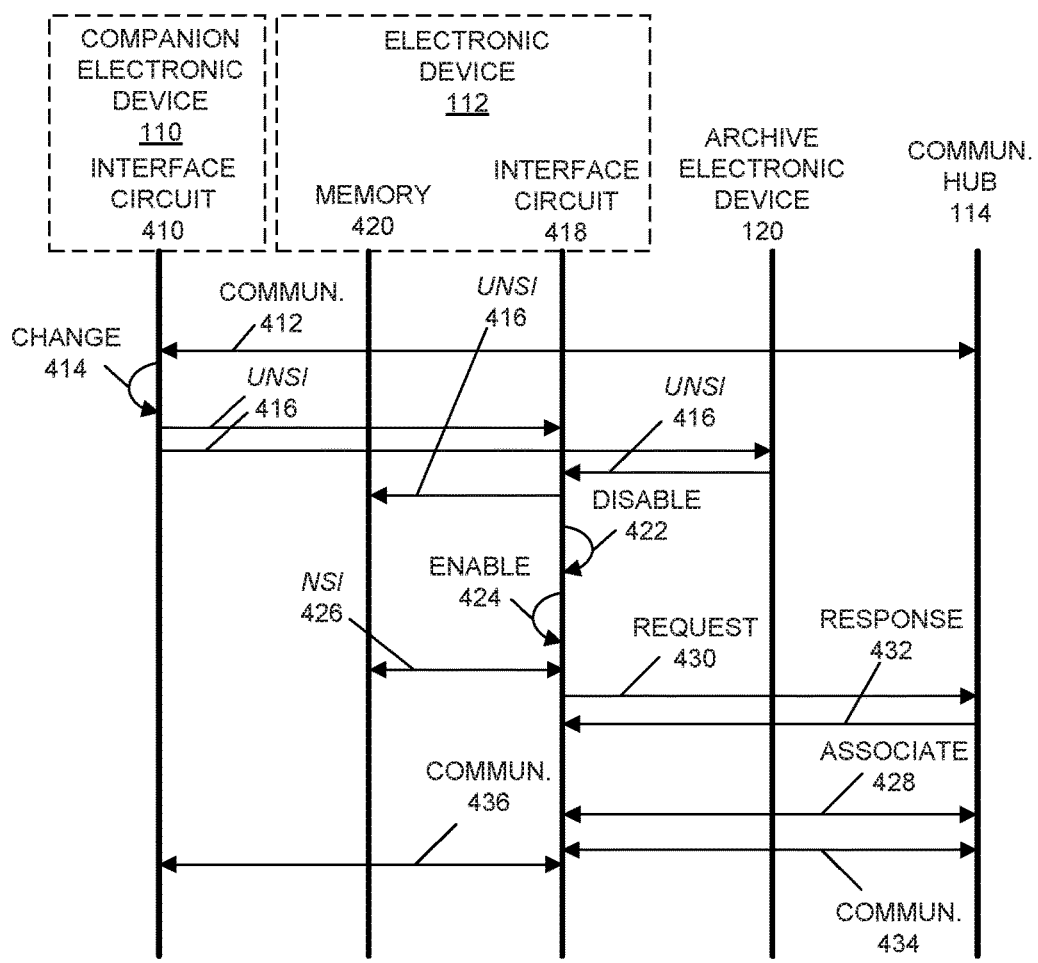
FIG. 4 is a flow diagram illustrating an example communication between electronic devices, according to some embodiments.

The association technique is further illustrated in FIG. 4, which illustrates an example communication between companion electronic device 110 and electronic device 112, according to some embodiments. In particular, interface circuit 410 in companion electronic device 110 may detect change 414 (e.g., associating or disassociating) based on communication 412 with communication hub 114. Then, companion electronic device 110 may provide at least updated network-state information (UNSI) 416 (or complete network-state information instead of differential information) to electronic device 112. Alternatively or additionally, companion electronic device 110 may provide at least updated network-state information 416 to archive electronic device 120, which can provide at least updated network-state information 416 to electronic device 112.

After receiving updated network-state information 416, interface circuit 418 in electronic device 112 may store updated network-state information 416 in memory 420. Subsequently, interface circuit 418 may use updated network-state information 416 to associate 428 with communication hub 114. In particular, updated network-state information 416 may be used to determine when to turn off or disable 422 a different communication capability (e.g., Bluetooth) and to turn on or enable 424 WiFi. Updated network-state information 416 may also provide network-state information (NSI) 426 from memory 420 for use in associating 428 with communication hub 114.

In some embodiments, prior to associating 428, interface circuit 418 provides an optional request 430 to associate with communication hub 114 and receives an optional response 432 from communication hub 114.

Furthermore, after associating 428, interface circuit 418 may communicate 434 data or information with communication hub 114 using WiFi, and/or may communicate 436 data or information with companion electronic device 110.

As shown in FIG. 4, according to some embodiments, the electronic device may quickly associate with the communication hub in a network-aware manner. In addition, the electronic device may have access to (e.g., cached) network-state information that allows the electronic device to associate with the communication hub.

In some embodiments, the shared network-state information may allow the electronic device to join the same network (and, thus, the same communication hub) as the companion electronic device, and to do so efficiently and quickly, so that any disruption to communication is reduced or minimized. If the electronic device only has access to a same list of networks as the companion electronic device, but does not have information about the current network or WLAN with which the companion electronic device is associated, the electronic device may not be able to join the same network. Consequently, in this case, when the electronic device tries to join a WiFi network, it may need to scan the available channels (e.g., 13 2.4 GHz channels for the case of a WiFi network based on 802.11b). The electronic device may also try to look for known networks in the most recently used (MRU) order. However, this approach does not guarantee that the electronic device will associate with the same network as the companion electronic device.

To address this, the electronic device may have several capabilities or functions in the association technique. In particular, to get the companion electronic device and the electronic device on the same network, the electronic device may need to know the network over which the companion electronic device is associated with the communication hub. This may be accomplished by having the companion electronic device transmit information specifying its currently associated network to the electronic device.

Moreover, the association technique may allow the companion electronic device and the electronic device to be on the same network quickly. Currently, the electronic device may need to scan the available channels to find the known network, which may not provide a fast connection or association. In the association technique, the network-state information shared by the companion electronic device and cached by the electronic device may be leveraged to allow the electronic device to connect or associate faster to the relevant network. Because the companion electronic device and the electronic device are in close proximity, it may be safe to assume that even in multi access-point environments, the electronic device and companion electronic device may be in the same BSS. Consequently, if the companion electronic device provides the BSSID of the communication hub to the electronic device, then the electronic device can utilize this information (and, more generally, the network-state information) to connect faster to the network of the companion electronic device without first performing scans of all the available channels.

Furthermore, the association technique may reduce the time when Bluetooth and WiFi transports are not usable (e.g., the network-state information may be used to make WiFi transport active without suspending Bluetooth for too long). For example, by using the TSF from the companion electronic device and the beacon interval of the communication hub (both included in the network-state information), the electronic device can determine the time interval during which the next beacon will be transmitted from the communication hub. Using the information on the transmission of the next beacon, the electronic device may only wake up at an appropriate time and start scanning for beacons when beacons are about to be transmitted by communication hub 114 without wasting time to synchronize its clock.

As described, based on the IEEE 802.11 standard, an IEEE 802.11-compatible device may have a TSF counter, which can be used for timing synchronization among electronic devices or nodes in the same cell. Moreover, as mentioned above, according to the IEEE 802.11 standard, the access point may transmit beacon frames, which announce the presence of the WLAN. The beacon frames may include a timestamp of the TSF counter in the access point to synchronize the TSF counters of other nodes in the cell or BSS. The TSF timestamps may be written to the beacon frames at the time they are sent on the physical medium, thereby compensating for internal hardware delays (e.g., in an IEEE 802.11 chipset) and without being affected by medium access control (MAC) delays. A receiving node may accept the timing-synchronization information in beacon frames that are sent from the access point servicing the BSS of the node. If the TSF counter of the receiving node is different from the timestamp in the received beacon frame, the receiving node may set its local TSF counter to the received timestamp value.

On a WiFi-Bluetooth combined chip (e.g., an integrated circuit that includes both WiFi and Bluetooth capabilities), the chip may be aware of a relation between Bluetooth and WiFi timestamps. Therefore, if both the electronic device and the companion electronic device use WiFi-Bluetooth combined chips, and if the electronic device can learn about the Bluetooth and WiFi timestamps of the companion electronic device, it can calculate the WiFi timestamp based on the knowledge of its own Bluetooth timestamp and perform the timing synchronization without having to spend time on synchronization by listening to the beacon sent by the access point. As described above, using the updated time synchronization information, the electronic device can wake up at the appropriate time and scan to join the same network as the companion electronic device.

In some embodiments, for an electronic device using a WiFi-Bluetooth combined chip, the Bluetooth clock timestamp of the electronic device, $T_{BT}^g$, is related to the WiFi clock timestamp of the electronic device $T_{WiFi}^g$. Similarly, for a companion electronic device using a WiFi-Bluetooth combined chip, the Bluetooth clock $T_{BT}^c$ is related to the WiFi clock $T_{WiFi}^c$. During the association technique, the companion electronic device may transmit timing-synchronization information $T_{BT}^c$ (among other network-state information) to the electronic device using the Bluetooth link between the electronic device and the companion electronic device. Using $T_{BT}^c$ and $T_{BT}^g$, the electronic device can figure out the time drift (offset) of the WiFi clock at the electronic device and calculate the $T_{WiFi}^g$. This drift may be due to hardware and or software delays in transmission and receipt of packets over a WiFi link at the electronic device.

In some embodiments, the electronic device only communicates with the companion electronic device over Bluetooth. In this case, the Bluetooth master clock $T_{BT}$ may be the same as the Bluetooth clock at the companion electronic device, $T_{BT}^c$:

$$T_{BT}^c = T_{BT}.$$

Alternatively, in some embodiments, there are other electronic devices (other than the companion electronic device) that communicate with the electronic device over Bluetooth. Therefore, the Bluetooth master clock may be the Bluetooth clock of any of the other electronic devices communicating with the electronic device over Bluetooth. In some embodiments, there may be a drift (offset) between the companion electronic device's Bluetooth clock and the Bluetooth master clock, i.e., $\text{drift}_{BT}^c$. This drift may be due to hardware and/or software delays in transmission and receipt of packets over a Bluetooth link at the companion electronic device. Therefore, at the electronic device, the following relationship holds:

$$T_{BT}^c = \text{drift}_{BT}^c + T_{BT}.$$

Additionally, there may be a drift (offset) between the WiFi clock of the companion electronic device compared to the master WiFi clock (WiFi clock of the communication hub, e.g., access point). This drift may be due to hardware and or software delays in transmission and receipt of packets over a WiFi link at the companion electronic device. This can be shown in the following simple equation, where $T_{WiFi}$ and $\text{drift}_{WiFi}^c$ indicate the master WiFi clock and the difference between the WiFi clock of the companion electronic device and the WiFi master clock, respectively:

$$T_{WiFi}^c = \text{drift}_{WiFi}^c + T_{WiFi}.$$

As described above, while receiving an update in network-state information from the companion electronic device, the electronic device receives (via Bluetooth communication) the Bluetooth and WiFi clock time stamp information of the companion electronic device, including $T_{BT}{}^c$, $\text{drift}_{BT}{}^c$, $T_{BT}$, $\text{drift}_{WiFi}{}^c$, and $T_{WiFi}{}^c$, and $T_{WiFi}$.

The electronic device also has its own local clock, e.g., a local Bluetooth clock and a local WiFi clock. Similar to the companion electronic device, there is typically a drift between the Bluetooth clock of the electronic device and the reference Bluetooth clock. This drift may be due to hardware and or software delays in transmission and receipt of packets over a Bluetooth link at the electronic device. This can be shown in the following simple equation where $\text{drift}_{BT}{}^g$ indicates the drift between the Bluetooth clock at the electronic device and the master Bluetooth clock:

$$T_{BT}{}^g = \text{drift}_{BT}{}^g + T_{BT}.$$

Using the information received from the companion electronic device in network-state information updates, and knowing $T_{BT}{}^g$ locally, the electronic device can calculate the value of $\text{drift}_{BT}{}^g$ above.

In a WiFi-Bluetooth combined chip, the drift of the WiFi clock is related to the drift of the Bluetooth clock. This relationship may be based on radio hardware parameters in the transceiver circuitry and the radio frequency (RF) environment of the electronic device. Therefore, the difference between the WiFi clock of the companion electronic device and the WiFi clock of the electronic device (herein referred to as "$_\Delta{}^g$") may be calculated using the known values for $\text{drift}_{BT}{}^c$, $\text{drift}_{BT}{}^g$, and the TX/RX parameters of the combined chip using an equation like the following, where f(.) is a known function:

$$\text{drift}_\Delta{}^g = f(\text{drift}_{BT}{}^c, \text{drift}_{BT}{}^g, \text{BT/WiFi combo chip parameters}).$$

The TX/RX parameters of the combined chip on the electronic device and on the companion electronic device may differ slightly. Once the value of $\text{drift}_\Delta{}^g$ is calculated above, the WiFi clock timestamp of the electronic device, $T_{WiFi}{}^g$, may be obtained as follows:

$$T_{WiFi}{}^g = \text{drift}_{WiFi}{}^g + T_{WiFi}$$

$$T_{WiFi}{}^g = \text{drift}_{WiFi}{}^c + \text{drift}_\Delta{}^g + T_{WiFi}.$$

As described above, being able to calculate $T_{WiFi}{}^g$ without directly synchronizing with the access point gives the electronic device the ability to suspend the Bluetooth link and to switch to WiFi within a short period of time. That is, the described association technique may reduce the amount of time that the electronic device stays disconnected from the companion electronic device. At the same time, the WiFi radio at the electronic device may not need to waste time to listen for a beacon from the access point in order to synchronize its WiFi clock.

Additionally, in the association technique, the electronic device may not connect or associate if it does not help. In particular, the electronic device may avoid wasting time and power attempting to associate with a WiFi network if the companion electronic device is not associated with any network or is associated with a network that the electronic device cannot join. Therefore, when the electronic device cannot be on the same network as the companion electronic device, the electronic device and the companion electronic device may not be able to perform a high-throughput data transfer.

In some embodiments, the electronic device is aware of the WiFi link state of the companion electronic device based on the network-state information. When paired, the electronic device and the companion electronic device can communicate using the Bluetooth link. When the electronic device wants to switch to using WiFi to communicate with the companion electronic device, it may use the network-state information to associate with the WLAN. The electronic device may, for example, desire to communicate with the companion electronic device using WiFi when it wants to exchange data with the companion electronic device at a high data rate (higher than feasible over Bluetooth).

In some embodiments, the network-state information may include the last four channels used by the companion electronic device for every known network, and the BSSID on the network with which the companion electronic device is associated. This information may be used by the electronic device to perform as little as one channel scan (e.g., scanning the most recent channel used by the companion electronic device to associate with the network) to find this network.

In some embodiments using IEEE 802.11b standard where 13 of the 2.4 GHz band channels (among 14) are allowed access, the association technique may save approximately 1200 ms, i.e., 12 passive scans each requiring 100 ms time in scans to detect the BSSID and the channel the companion device is associated with. Therefore, the electronic device may join the network and may be able to communicate with the companion electronic device faster. In some embodiments, once the electronic device identifies the channel the companion device is using to associate with the network, the electronic device can perform an active scan (e.g., transmit a probe request requiring a shorter time period, such as 10 milliseconds) to associate with that network.

The companion electronic device may also maintain a scan cache, which can include: WiFi settings, scans, roam scans, or location scans. This may not incur any additional cost to the companion electronic device and can be sent to the electronic device for reuse. In particular, the electronic device can reuse the scan result if the scan cache age is within a certain heuristic value (e.g., 1, 5, 30, or 60 min). This may further reduce the time and power used for scanning.

Furthermore, the electronic device may store the channel on which it was last associated with a particular network. In a home-like (e.g., single access-point) environment, it may be likely that the network is still on the same channel, thereby saving time spent on scans of all available channels.

Figure 5:
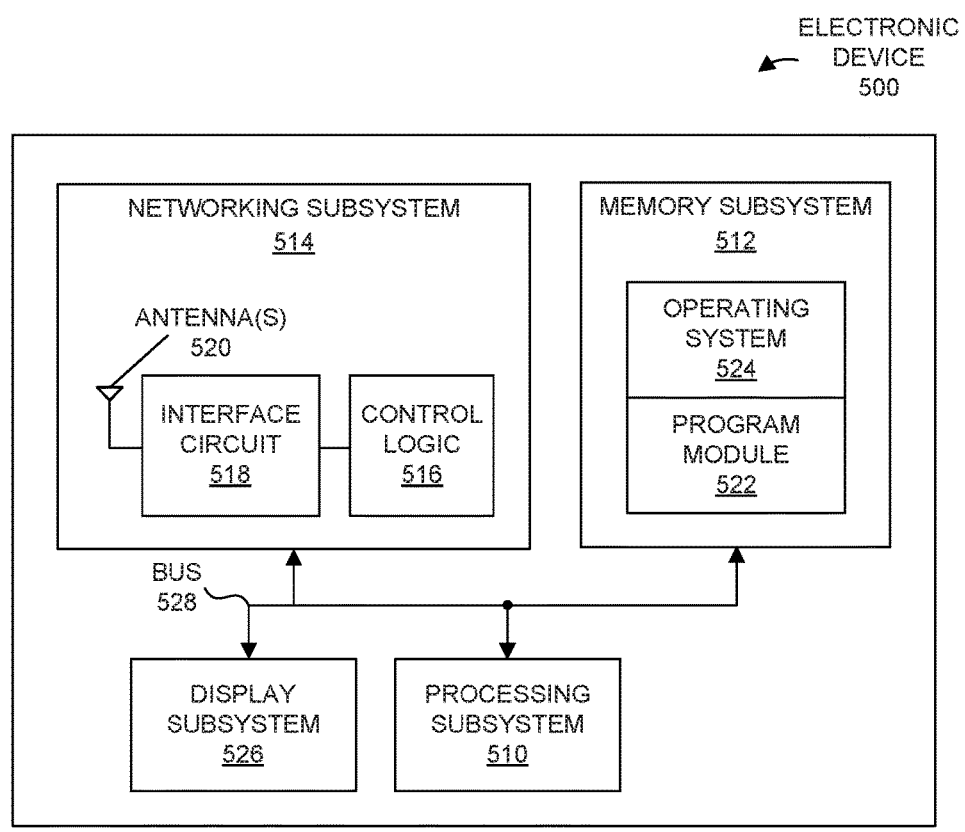
FIG. 5 is a block diagram illustrating an example electronic device, according to some embodiments.

FIG. 5 presents an example block diagram illustrating an electronic device 500, such as companion electronic device 110 or electronic device 112 in FIG. 1, according to some embodiments. Electronic device 500 includes processing subsystem 510, memory subsystem 512, and networking subsystem 514. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs).

Various embodiments can be implemented, for example, using one or more electronic devices, such as electronic device 500 shown in FIG. 5. In some embodiments, electronic device 500 can be used, for example, to implement a method (e.g., method 200 of FIG. 2) for method for providing updated network-state information to an electronic device by a companion electronic device or an archive electronic device. In some embodiments, electronic device 500 can be used, for example, to implement a method (e.g., method 300 of FIG. 3) for method for associating with a communication hub by an electronic device using updated network-state information received from a companion electronic device or an archive electronic device. Electronic device 500 can be any electronic device capable of being configured to perform the functions described herein.

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. One or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that includes one or more caches coupled to a memory in electronic device 500. In some embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In some embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (e.g., to perform network operations), including: control logic 516, an interface circuit 518, and one or more antennas 520. For example, networking subsystem 514 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a WiFi networking system), an Ethernet networking system, and/or another networking system.

Networking subsystem 514 includes processors, controllers, radios/antennas, sockets/plugs, and/or other devices used for coupling to, communicating on, and handling data and events for each supported networking system. The mechanisms used for coupling to, communicating on, and handling data and events on the network for each network system are sometimes collectively referred to as a "network interface" for the network system. Moreover, in some embodiments a "network" between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections between the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, a smart watch, a sensor, a user-interface device and/or another electronic device.

Although specific components are used to describe electronic device 500, in some embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. For example, electronic device 500 can include, but is not limited to, a data collection subsystem, an audio and/or video subsystem, an alarm subsystem, a media processing subsystem, and/or an input/output (I/O) subsystem. Also, although separate subsystems are shown in FIG. 5, in some embodiments, some or all of a given subsystem or component can be integrated into one or more of the other subsystems or component(s) in electronic device 500. For example, in some embodiments, program module 522 is included in operating system 524.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 514, such as a radio. Moreover, the integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. The radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. "Monitoring" as used herein includes receiving signals from other electronic devices and possibly performing one or more processing operations on the received signals, e.g., determining if the received signal includes an advertising frame, etc.

While communication protocols compatible with WiFi standards and Bluetooth were used as illustrative examples, the described embodiments of the association techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software, or both. For example, at least some of the operations in the association technique may be implemented using program module 522, operating system 524 (e.g., a driver for interface circuit 518), or in firmware in interface circuit 518. Alternatively or additionally, in some embodiments, at least some of the operations in the association technique may be implemented in a physical layer, such as hardware in interface circuit 518.

In the preceding description, we refer to "embodiments." "embodiments" describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a processor configured to communicate, via a first communication technique, with an other electronic device;
wherein the processor is further configured to:
receive, from the other electronic device, network-state information comprising an identifier of a communication hub and timing-synchronization information for beacons from the communication hub, wherein the communication hub is external to the other electronic device, and wherein the time-synchronization information comprises at least one of a Bluetooth clock or a WiFi clock of the other electronic device;
in response to receiving the network-state information, disable communication, via the first communication technique, with the other electronic device and enable communication, via a second communication technique, with the other electronic device, wherein the first communication technique is different from the second communication technique; and
associate with the communication hub via the second communication technique on a wireless network based at least in part on the network-state information, wherein the wireless network comprises the other electronic device and the communication hub.

2. The electronic device of claim 1, wherein the processor is further configured to receive the network-state information from the other electronic device using the first communication technique.

3. The electronic device of claim 1, wherein the processor is further configured to receive the network-state information from the other electronic device using a cellular-telephone communication technique or a peer-to-peer communication technique.

4. The electronic device of claim 1, wherein the first communication technique comprises Bluetooth and the second communication technique comprises WiFi.

5. The electronic device of claim 1, wherein the communication hub comprises an access point, a set-top box, a printer, or a thermostat.

6. The electronic device of claim 1, wherein the processor is further configured to:
prior to the associating, determine, based at least in part on the network-state information, that the electronic device is authorized to join the wireless network.

7. The electronic device of claim 1, wherein, to associate with the communication hub, the processor is configured to:
provide a probe request to the communication hub; and
receive a response from the communication hub.

8. The electronic device of claim 1, wherein the processor is further configured to:
after the associating with the communication hub, communicate with the other electronic device using the second communication technique.

9. The electronic device of claim 1, wherein the network-state information further comprises a channel associated with the wireless network.

10. The electronic device of claim 9, wherein the processor is further configured to scan the channel as part of the associating with the communication hub.

11. The electronic device of claim 1, wherein the network-state information specifies a schedule indicating when the communication hub transmits the beacons.

12. The electronic device of claim 11, wherein the processor is further configured to disable the first communication technique a predetermined amount of time before the communication hub transmits one of the beacons based at least in part on the schedule.

13. The electronic device of claim 1, wherein:
the other electronic device is a companion electronic device,
the first communication technique comprises Bluetooth and the second communication technique comprises WiFi, and
the processor is further configured to determine a WiFi clock of the electronic device used for the associating with the communication hub based at least in part on the Bluetooth clock of the companion electronic device, the WiFi clock of the companion electronic device, and a Bluetooth clock of the electronic device.

14. The electronic device of claim 1, wherein the other electronic device is a companion electronic device or an archive electronic device.

15. A method for associating with a communication hub, the method comprising:
- receiving, from a companion electronic device, network-state information comprising an identifier of the communication hub and timing-synchronization information for beacons from the communication hub, wherein the companion electronic device communicates with the communication hub over the wireless network, wherein the communication hub is external to the companion electronic device, and wherein the time-synchronization information comprises at least one of a Bluetooth clock of the companion electronic device or a WiFi clock of the companion electronic device;
- in response to receiving the network-state information, disabling communication, via a first communication technique, with the companion electronic device, and enabling communication, using a second communication technique, with the companion electronic device, wherein the first communication technique is different from the second communication technique;
- associating with the communication hub on the wireless network based at least in part on the network-state information; and
- communicating with the companion electronic device using the second communication technique.

16. The method of claim 15, wherein the companion electronic device and the electronic device are associated with a common entity.

17. The method of claim 15, further comprising:
- in response to the receiving the network-state information, transmitting an acknowledgment to the companion electronic device.

18. A computer-program product for use in conjunction with an electronic device, the computer-program product comprising a non-transitory computer-readable storage medium and computer-program operations embedded therein to associate with a communication hub, the computer-program operations comprising:

- instructions for receiving, from a companion electronic device, network-state information comprising an identifier of the communication hub and timing-synchronization information, wherein the timing-synchronization information comprises a first clock of the companion electronic device and a second clock of the companion electronic device and wherein the communication hub is external to the companion electronic device;
- instructions for disabling communication, via a first communication technique, with the companion electronic device, and enabling communication, via a second communication technique, with the companion electronic device, wherein the first communication technique differs from the second communication technique;
- instructions for determining a third clock of the electronic device used for associating with the communication hub based at least in part on the first and second clocks of the companion electronic device and a fourth clock of the electronic device;
- instructions for joining a wireless network based at least in part on the network-state information, wherein the wireless network comprises the companion electronic device and the communication hub; and
- instructions for associating with the communication hub on the wireless network via the second communication technique.

19. The computer-program product of claim 18, wherein the network-state information is received from the companion electronic device using the first communication technique.

20. The electronic device of claim 1, wherein the processor is further configured to:
- after the associating with the communication hub, communicate with the other electronic device to exchange data at a second data rate using the second communication technique, wherein the second data rate is higher than a first data rate associated with the first communication technique;
- after completion of the data exchange, disable the communicating with the other electronic device using the second communication technique; and
- enable the communicating with the other electronic device using the first communication technique.

* * * * *